(12) United States Patent
Aikawa et al.

(10) Patent No.: US 8,037,268 B2
(45) Date of Patent: Oct. 11, 2011

(54) STORAGE SYSTEM AND OPERATION METHOD THEREOF

(75) Inventors: Hirokazu Aikawa, Hiratsuka (JP); Kazuhiro Usami, Odawara (JP); Hirokazu Ishii, Minamiashigara (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 474 days.

(21) Appl. No.: 12/318,992

(22) Filed: Jan. 14, 2009

(65) Prior Publication Data

US 2010/0142070 A1   Jun. 10, 2010

(30) Foreign Application Priority Data

Dec. 5, 2008 (JP) ................................ 2008-311291

(51) Int. Cl.
- *G06F 13/00* (2006.01)
- *G06F 13/28* (2006.01)
- *G11B 15/18* (2006.01)
- *G11B 17/00* (2006.01)
- *G11B 19/02* (2006.01)
- *G11B 5/78* (2006.01)

(52) U.S. Cl. ..... 711/162; 711/101; 711/4; 711/E12.002; 360/72.1; 360/134

(58) Field of Classification Search .................. 711/162, 711/104, 4, E12.002; 360/72.1, 134
See application file for complete search history.

(56) References Cited

U.S. PATENT DOCUMENTS

| 5,384,673 | A | 1/1995 | Yoshioka et al. |
| 6,378,007 | B1 * | 4/2002 | Southwell ......................... 710/1 |
| 6,870,699 | B1 * | 3/2005 | Mikkelsen et al. .............. 360/55 |
| 2005/0102330 | A1 * | 5/2005 | Beeston et al. ................ 707/204 |
| 2008/0030887 | A1 | 2/2008 | Ochi et al. |
| 2008/0250197 | A1 * | 10/2008 | Daily et al. ................... 711/111 |
| 2009/0316290 | A1 * | 12/2009 | Biskeborn et al. .............. 360/75 |
| 2010/0033869 | A1 * | 2/2010 | Oishi et al. ................. 360/78.02 |
| 2010/0079890 | A1 * | 4/2010 | Brummet ........................ 360/40 |

FOREIGN PATENT DOCUMENTS

| JP | 4-286018 | 3/1991 |
| JP | 2008-41178 | 8/2006 |

* cited by examiner

*Primary Examiner* — Edward Dudek, Jr.
(74) *Attorney, Agent, or Firm* — Stites & Harbison PLLC; Juan Carlos A. Marquez, Esq.

(57) ABSTRACT

Aiming to suitably balance, when backing up data to a magnetic tape, search time and writing/reading performance depending on the purpose of the backup, provided is a disk array apparatus including a disk device having hard disks, a magnetic tape device including a magnetic tape to which data to be backed up is written, and a control unit performing writing and reading processings of data between the disk device and the magnetic tape device. The control unit includes an FM (file mark) interval managing unit which receives a purpose of use when backing up the data on the magnetic tape, and from FM intervals which is held in association with the purpose of use thus received and which indicates an interval of recording FMs on the magnetic tape, acquires an FM interval corresponding to the purpose of use thus received, and transmits the acquired FM interval to the control unit.

10 Claims, 10 Drawing Sheets

TAPE GROUP INFORMATION TABLE 700

| | | | |
|---|---|---|---|
| 701 | TG-ID | 0002 | |
| 702 | TAPE TYPE | LTO-4 | |
| 703 | REDUNDANT CONFIGURATION | MIRROR | |
| 704 | ENCRYPTION SETTING | SET | |
| 705 | PURPOSE OF USE | PERFORMANCE EMPHASIZED | |
| 706 | LU INFORMATION | LUN | 0001 |
| | | LU CAPACITY | 1600GB |
| 707 | FM INTERVAL | 64GB | |
| 708 | TG STATUS | NORMAL | |
| 709 | NUMBER OF TAPES | 2 | |
| 710 | BACKUP FINISH TIME | 2008/11/25 02:30 | |

FIG. 7

STORAGE SYSTEM AND OPERATION METHOD THEREOF

CROSS-REFERENCE TO RELATED APPLICATIONS

The present application claims a priority from Japanese Patent Application No. 2008-311291 filed on Dec. 5, 2008, the content of which herein incorporated by reference.

BACKGROUND OF THE INVENTION

1. Field of the Invention

The present invention relates to a storage system and an operation method thereof, and more particularly to a storage system which can set, when backing up data on a magnetic tape, suitable search performance depending on the purpose of the backing-up, and an operation method thereof.

2. Related Art

For the backing-up of data stored in a high capacity storage apparatus such as a disk array apparatus, magnetic tape devices are widely used. In a magnetic tape device, data is written in serial from the head of a tape. Thus, unlike a disk device, it is not possible to make a direct access to a block to/from which data is written/read.

Thus, in the writing of data from a disk device, a tape drive records an identifier, which is a so-called file mark (hereinafter, referred to as an "FM") representing tape position information, on a magnetic tape by providing a non-signal interval, for example, every time a certain amount of data is written. When stored data is read out, data stored in a designated block is extracted by positioning the reading head of the tape drive to an FM recorded immediately before the data to be read, and continues to read the data up until a succeeding FM.

In relation to a technology achieving fast data writing and reading by recording on a magnetic tape position information of such as the above FMs, Japanese Patent Application Laid-open Publication No. 4-286018 proposes a method in which a correspondence is recorded on the tape, the correspondence being that between position information of data blocks and position partition information (file marks or the like) recorded on a tape and such information is expanded and used at the time of reading so that search performance can be enhanced in search speed. Further, Japanese Patent Application Laid-open Publication No. 2008-41178 proposes a method in which position information for the shortening of search time of data recorded on a file basis is stored in a header part, and recorded in the trailing end of a tape.

As described above, while it is possible to enhance the performance of searching data on a magnetic tape by recording FMs on the magnetic tape, a processing for recording an FM on the magnetic tape and a processing for reading the recorded FM each require three to five seconds at each position. For this reason, the smaller the intervals (which are each represented by an amount of data (e.g., in units of GB) recorded between FMs, and which are hereinafter referred to as "FM intervals") between FMs to be recorded, the closer the reading head can be positioned to a target data. On the other hand, there may be a case in which time required for recording FMs at the time of data writing is increased, and as a result performance of writing data on the tape is reduced.

In view of such tendency, in a backup processing in which much importance is placed on fast writing performance from a disk device to a magnetic tape, large FM intervals are taken in order to reduce the number of FMs to be recorded on a magnetic tape so that performance can be improved.

On the other hand, when a magnetic tape is used for the purpose of a file archive, a main processing is to read out specific information in the magnetic tape, i.e., to read out a specific file included in a logical unit stored in the magnetic tape. Thus, when FM intervals are large, there was a problem that the positioning to and reading of specific information would take time.

SUMMARY OF THE INVENTION

The present invention has been made in light of the above problem, and an object thereof is to provide a storage system which can set, when backing up data on a magnetic tape, suitable search performance depending on the purpose of the backing-up, and an operation method thereof.

A principle aspect of the present invention for solving the above and other problems is the provision of a storage system having a function to back up data stored in a storage area, the storage system comprising a storage device that includes a storage medium providing the storage area; a magnetic tape device that includes a magnetic tape providing a storage area, which is a data write destination, where the data stored in the storage area of the storage device is to be backed up; a control unit that performs writing and reading processings of the data between the storage device and the magnetic tape device; and a tape position information recording interval managing unit coupled to the storage device and the magnetic tape device, that receives backup type information, which is information indicating a backup type when backing up the data to the magnetic tape, acquires tape position information recording interval information corresponding to the backup type information thus received, from the tape position information recording interval information which is held in association with the backup type information thus received and which indicates a recording interval of tape position information on the magnetic tape, the tape position information being positional information recorded on the magnetic tape to associate a data storing location in the storage medium and a recording location of the data on the magnetic tape with each other, and transmits, to the control unit, the tape position information recording interval information thus acquired.

Problems and methods for solving thereof disclosed in this application will be more fully apparent from the following specification with reference to the accompanying drawings which relate to the Detailed Description of the Invention.

According to the present invention, when data is backed up on a magnetic tape, suitable search performance can be set depending on the use of the backup.

BRIEF DESCRIPTION OF THE DRAWINGS

FIG. 7 is a diagram showing an example of Tape Group Information Table 700;

DETAILED DESCRIPTION OF THE INVENTION

An embodiment of the present invention will be described below with reference to the drawings.

Figure 1:
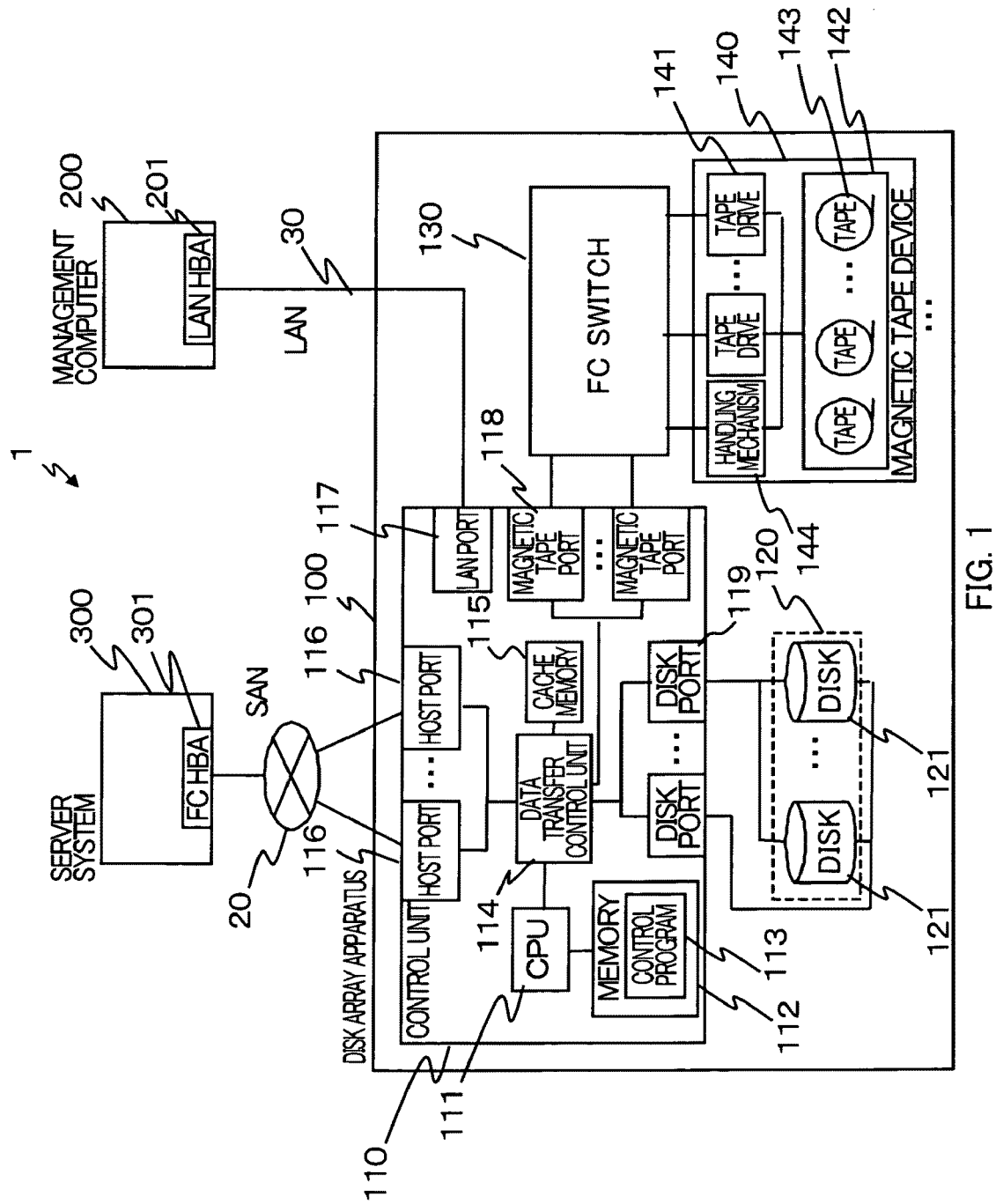
FIG. 1 is a diagram showing an information processing system 1 of a first embodiment of the present invention.

An information processing system 1 according to an embodiment of the present invention will be described with reference to FIG. 1. FIG. 1 shows a system configuration of the information processing system 1.

The information processing system 1 includes a disk array apparatus 100 (a storage system), a management computer 200, and a server system 300. The disk array apparatus 100 and the server system 300 are coupled to each other via a communication network 20, and a business application or the like operating on the server system 300 uses a storage area provided by the disk array apparatus 100 as a data storage space. In the present embodiment, the communication network 20 is a storage area network (SAN) using Fibre Channel (FC) protocol.

The disk array apparatus 100 and the management computer 200 are coupled to each other via a communication network 30. The management computer 200 is a service processor (hereinafter, referred to as an "SVP") which collects an activity of the disk array apparatus 100, or gives an operation command on management to the disk array apparatus 100. In the present embodiment, a local area network (LAN) is employed as the communication network 30.

The disk array apparatus 100 includes a disk device 120 that provides a storage area, a magnetic tape device 140, a control unit 110, and an FC switch 130. The magnetic tape device 140 is used as a backup destination of data stored in the disk device 120, or as a storage area for data backup in the case where data stored in the disk device 120 is archived on a file basis. In the embodiment shown in FIG. 1, the magnetic tape device 140 is integrally housed in the disk array apparatus 100 but may be housed in a housing separate from the disk array apparatus 100.

The disk device 120 includes a plurality of hard disk drives (hereinafter, referred to as "HDDs") 121. These HDDs 121 are managed in accordance, for example, with a RAID (Redundant Arrays of Inexpensive Disks) system and provide physical storage areas. In these physical storage areas, an OS (operating system) of the server system 300 to be described later stores at least one logical unit (hereinafter, referred to as an "LU") corresponding to a logical storage area. Each LU includes a logical unit number (hereinafter, referred to as an "LUN") representing an identification code for identifying each other.

A backup processing and an archiving processing to be performed from the disk device 120 to the magnetic tape device 140 are usually performed on an LU basis. A logical block address (hereinafter, referred to as an "LBA") in each LU corresponds to an amount of recorded data from a start of a magnetic tape, the magnetic tape being a backup destination or an archiving destination. In accordance with the correspondence thus made, and on the basis of an LBA designated from the server system 300, the disk device 120 can read out from the magnetic tape the designated data.

Next, the control unit 110 will be described. The control unit 110 mainly performs data I/O processing between the server system 300 and the disk device 120, and data I/O processing, along with a backup operation or the like, between the disk device 120 and the magnetic tape device 140. In addition, the control unit 110 also performs data I/O processing with the management computer 200. Each component of the control unit 110 will be described below.

A CPU 111 is a processor executing a control program 113, which is stored in a memory 112 such as a RAM or a ROM, for implementing data processing related to this embodiment. Specific functions included in the control program 113 will be described later.

A data transfer control unit 114 represents a processor package configured to include a processor controlling a data transfer among the server system 300, the disk device 120, and the magnetic tape device 140. The data transfer control unit 114 also provides, in association with controlling, a DMA (Direct Memory Access) function, an ECC (Error Checking and Correction) function, or the like.

A cache memory 115 represents a nonvolatile shared memory to be used by the data transfer control unit 114 and the CPU 111. The cache memory 115 stores therein a data table to be used for processing of the present embodiment, as will be described later.

Host ports 116 are communication ports which couple an internal network of the control unit 110 and the communication network 20. In the present embodiment, the host ports 116 are configured in accordance with FC protocol.

A management computer port 117 is a communication port which couples the internal network of the control unit 110 and the communication network 30. In the present embodiment, the management computer port 117 is compatible with LAN.

Magnetic tape ports 118 are communication ports which couple the internal network of the control unit 110 and an FC network coupling the FC switch 130 and the magnetic tape device 140. Disk ports 119 are communication ports for coupling the internal network of the control unit 110 and the disk device 120.

Next, the magnetic tape device 140 will be described. As described above, the magnetic tape device 140 writes data on or reads data from magnetic tapes 143 which are used as storage areas for a backup or an archiving of data stored in the disk device 120, the backup or archiving executed by the control unit 110.

The magnetic tape device 140 includes one or a plurality of tape drives 141. In each of the tape drives 141, data is written on or read from the magnetic tape 143 with a magnetic head. The magnetic tape 143 is attached to or detached from each tape drive 141 in such a way that the magnetic tape 143 housed in a housing 142 is automatically moved with a handling mechanism 144 including a handling robot.

As described above, when data stored in the disk device 120 is copied or moved to the magnetic tape 143 on an LU basis, the amount of data ranges from several hundreds GB to several TB. Thus, a storage area being a copying or a moving destination of data of the LUs is provided by a tape group (hereinafter, referred to as a "TG") configured to include a plurality of magnetic tapes 143.

Next, the management computer 200 will be described. In the present embodiment, as described above, the management computer 200 is the SVP which collects an activity of the disk array apparatus 100, or gives an operation command on management to the disk array apparatus 100. In the example of FIG. 1 there is illustrated a configuration in which the management computer 200 is housed in a housing separate from the disk array apparatus 100. However, other configurations may be made in which, for example, the management computer 200 is integrally built in the disk array apparatus 100.

Figure 2:
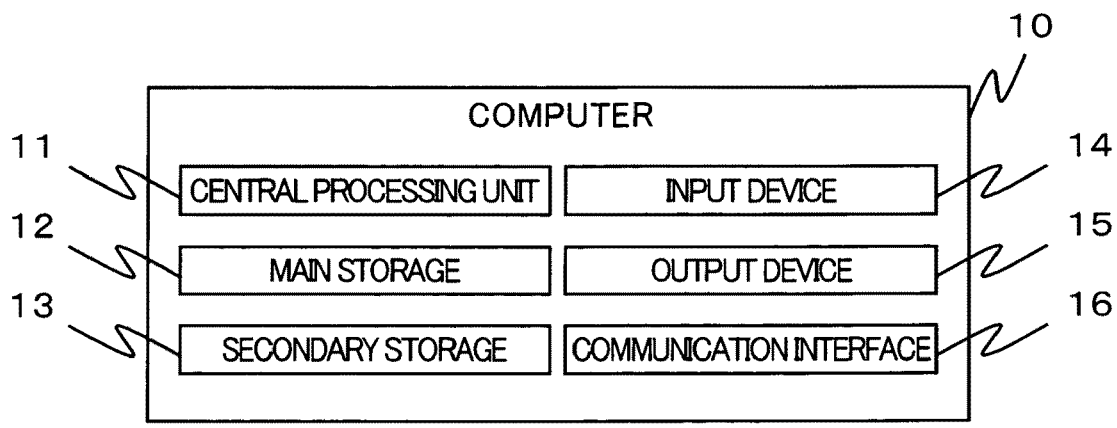
FIG. 2 is a diagram showing an example of a hardware configuration of a computer 10 to be used as a management computer 200 and a server system 300.

FIG. 2 shows an example of the hardware configuration of a computer 10 usable for the management computer 200 and the server system 300 to be described later. The computer 10 includes a central processing unit 11 (e.g., a CPU (Central Processing Unit) or an MPU (Micro Processing Unit)), a main storage 12 (e.g., a RAM (Random Access Memory) or a ROM (Read Only Memory)), a secondary storage 13 (e.g., a hard disk), an input device 14 (e.g., a keyboard or a mouse) that receives an input from the user, an output device 15 (e.g., a liquid crystal monitor), and a communication interface 16 (e.g., an NIC (Network Interface Card) or an HBA (Host Bus Adapter); in the case of the management computer 200, an HBA 201 for LAN connection) implementing communications with other devices.

Figure 3:
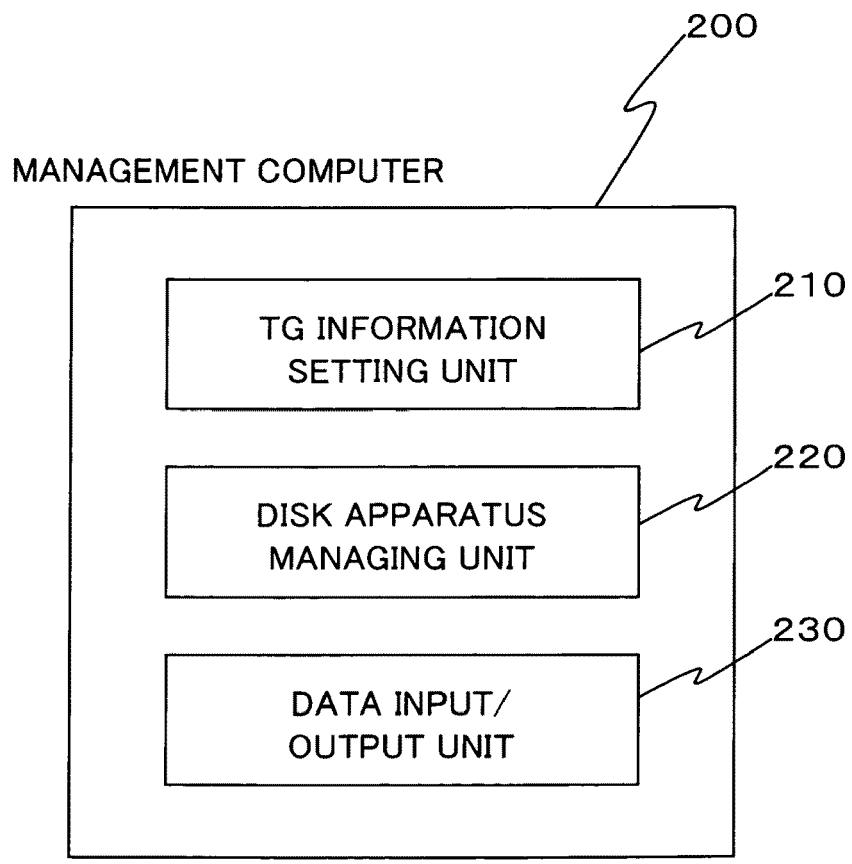
FIG. 3 is a diagram showing an example of a software configuration of the management computer 200.

FIG. 3 shows an example of main functional blocks of the management computer 200. In the example of FIG. 3, the management computer 200 is configured to include a TG information setting unit 210, a disk apparatus managing unit 220, and a data input/output unit 230. These functional blocks are implemented in such a way that programs stored in the secondary storage 13 of the computer 10 shown in FIG. 2 are read out to the main storage 12 and executed by the central processing unit 11, for example.

The TG information setting unit 210 receives, through the input device 14, a command to newly generate a TG providing a storage area being a target to which data stored in the disk device 120 is copied or moved for the purpose of a backup or the like, or to change a setting item having already been set, by the user of the information processing system 1 of the present embodiment. As will be described later, the TG information thus received is transmitted to the control unit 110 of the disk array apparatus 100. As also will be described later, in the TG information, information on an FM interval setting according to the present embodiment is included.

The disk apparatus managing unit 220 achieves a function of, in response to the user's command or depending on a predetermined setting for example, automatically collecting an activity of the disk array apparatus 100 and outputting the activity thus collected to the output device 15, or a function of, in accordance with a command inputted by the user through the input device 14 for example, giving an operation command on management to the disk array apparatus 100.

The data input/output unit 230 controls data input/output between the management computer 200 and the input device 14, the output device 15, or the control unit 110 of the disk array apparatus 100.

Figure 4:
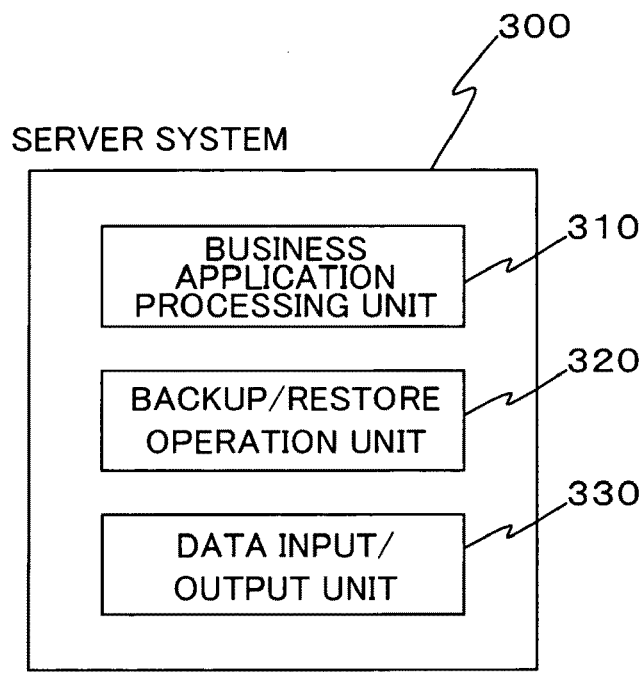
FIG. 4 is a diagram showing an example of a software configuration of the server system 300.

Next, the server system 300 will be described. The server system 300 (an external device) is a computer that executes a business application or the like to which a storage area provided by the disk array apparatus 100 is allocated. The server system has, for example, the hardware configuration of the computer 10 shown in FIG. 2. FIG. 4 shows an example of main functional blocks of the server system 300. In the example of FIG. 4, the server system 300 is configured to include a business application processing unit 310, a backup/restore operation unit 320, and a data input/output unit 330. These functional blocks are implemented in such a way that programs stored in the secondary storage 13 of the computer 10 shown in FIG. 2, for example, are read out to the main storage 12 and executed by the central processing unit 11.

The business application processing unit 310 executes an application program to be used on business by the user of the information processing system 1 so as to perform processing data on business related matters. While executing this application program, the server system 300 performs data input/output with the disk array apparatus 100.

The backup/restore operation unit 320 achieves a function of, in response to a request on backup/restore processing by the user through the input device 14 for example, transmitting the request to the control unit 110 of the disk array apparatus 100. For example, after receiving from the user a request including the backing-up of data, on the magnetic tape device 140, of a specific LU stored in the disk device 120, the backup/restore operation unit 320 transmits the request to the control unit 110 of the disk array apparatus 100.

The data input/output unit 330 controls data input/output between the server system 300 and the input device 14, the output device 15, or the control unit 110 of the disk array apparatus 100.

Figure 5:
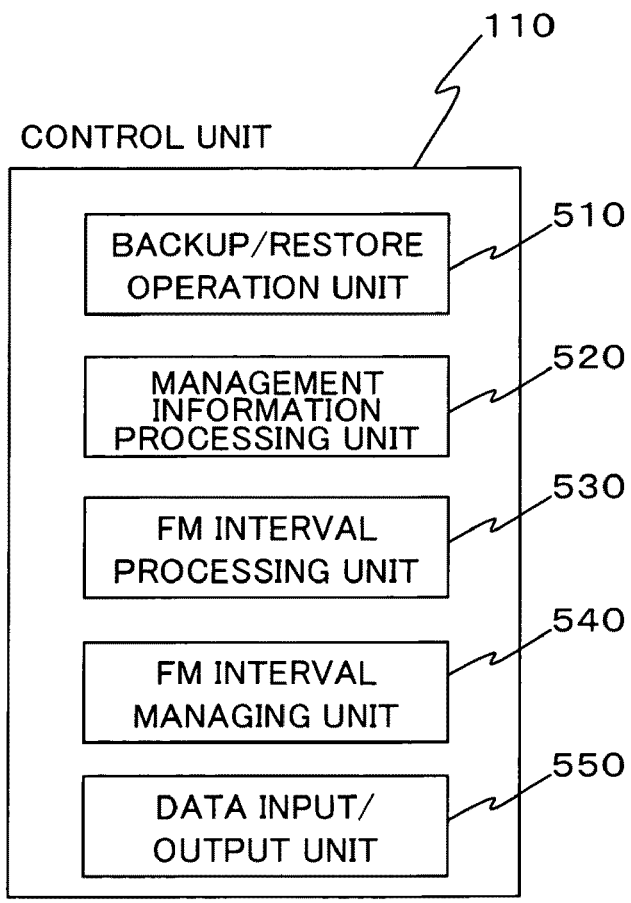
FIG. 5 is a diagram showing an example of a software configuration of a control unit 110.

Next, the control unit 110 of the disk array apparatus 100 will be described. FIG. 5 shows an example of main functional blocks of the control unit 110. In the example of FIG. 4, the control unit 110 configured to include a backup/restore operation unit 510, a management information processing unit 520, an FM interval processing unit 530, an FM interval managing unit 540, and a data input/output unit 550. These functional blocks are achieved in such a way that programs corresponding to the respective functions are executed by the CPU 111 or the data transfer control unit 114 in the control unit 110 of FIG. 1.

In this embodiment, for example, the functions of the backup/restore operation unit 510 and the data input/output unit 550 are implemented mainly by the data transfer control unit 114; and the functions of the management information processing unit 520, the FM interval processing unit 530, and the FM interval managing unit 540 are implemented by causing the CPU 111 to execute a part, corresponding to the respective functional blocks, included in the control program 113 stored in the memory 112. However, the place of storing the programs achieving these functions is not limited to a specific storage or a memory. Programs implementing these functions may be appropriately determined depending on the configuration of each disk array apparatus 100.

The backup/restore operation unit 510 is a function unit which, in response to a request from the backup/restore operation unit 320 of the server system 300, performs backup processing or restoring processing in accordance with the received request. In the backup/restore operation unit 510, a correspondence table is held in which correspondence between an LBA of an LU of a backup source (a copy source) and an amount of data recorded on the magnetic tape 143 is recorded. Thus, even when compressed data is recorded on the magnetic tape 143, corresponding data can be extracted from the magnetic tape 143 by designating an LBA of an LU of a backup source.

The management information processor 520 has a function with which tape management information is written on or read out from the magnetic tape 143, the tape management information having been subjected to backup or the like from the disk device 120. The tape management information will be described later.

The FM interval processing unit 530 has a function of transferring data related to an FM interval to the FM interval managing unit 540 to be described later, the data inputted by the user through the input device 14 of the management computer 200.

The FM interval managing unit 540 representing a tape position information recording interval managing unit has a function of performing, when data is recorded from the disk device 120 on the magnetic tape 143 loaded on the magnetic tape device 140, control to adjust each interval between FMs to be recorded on the magnetic tape 143, on the basis of data on FM intervals, set by the user, to be transferred from the FM interval processing unit 530, or of data on FM intervals set by itself in accordance with a predetermined condition.

Data processing to be performed in the FM interval processing unit 530 and the FM interval managing unit 540 will be described in detail later with reference to a processing flow and to a data table to be referred therein.

The data input/output unit 550 controls data input/output between the control unit 110 of the disk array apparatus 100 and the input device 14 or the output device 15.

===Policy on FM Interval Setting===

Figure 6:
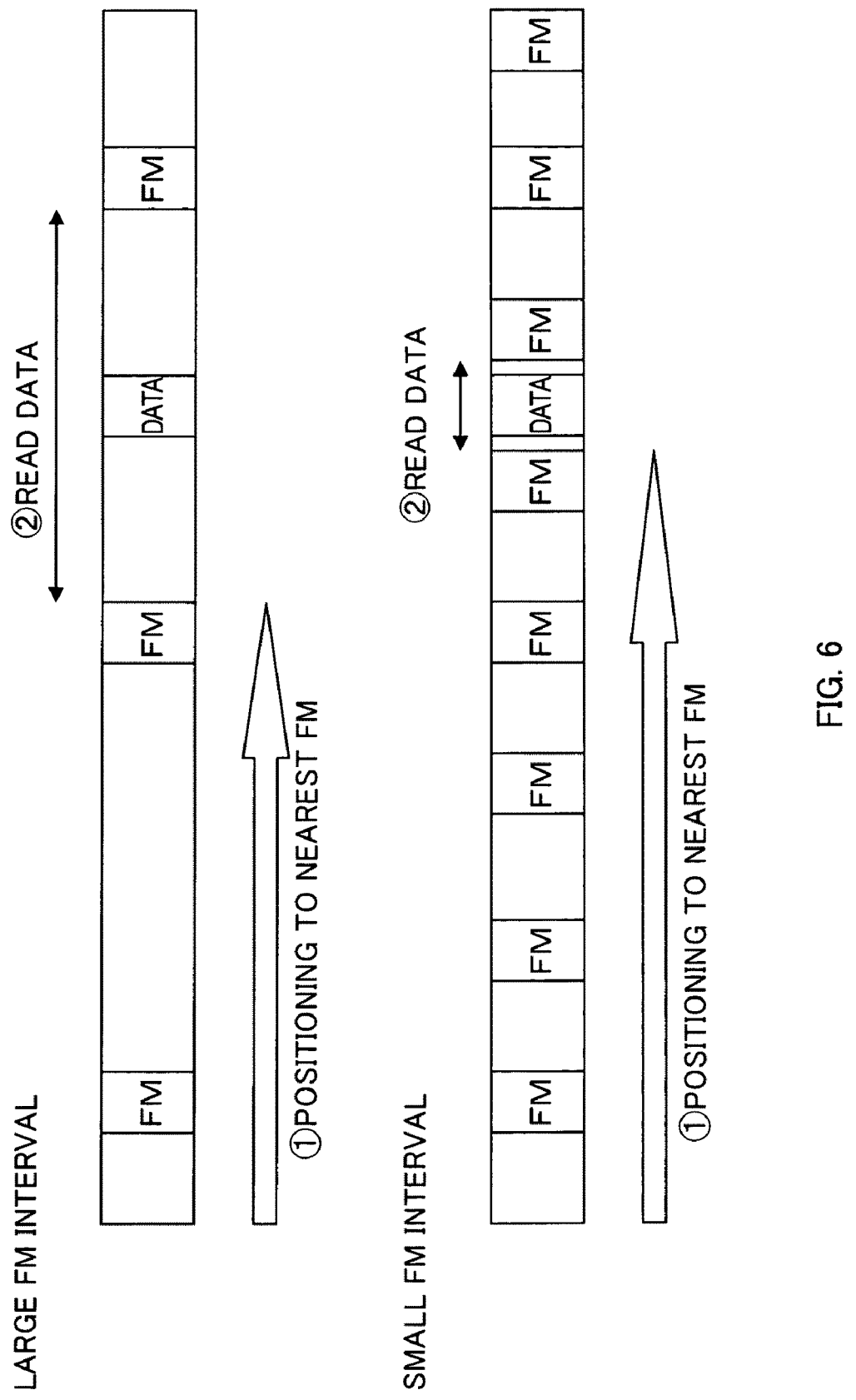
FIG. 6 is a schematic view showing how data is recorded on a magnetic tape 143 in cases where FM intervals are large and small.

Now, how to consider the FM interval setting of the present invention will be briefly described. FIG. 6 schematically shows how data is recorded on the magnetic tape 143 in cases where FM intervals are large and small.

As shown on the upper diagram of FIG. 6, when each interval between FMs recorded on the magnetic tape 143 is set relatively large, time required for recording FMs at the time of writing data on the magnetic tape 143 is shortened, and as a result, performance of writing data on the magnetic tape 143 is improved. On the other hand, an amount of data stored between each adjacent FMs is relatively large. For this reason, an amount of data between FMs to be read out from the magnetic tape 143 to extract desired data is relatively large, thus resulting in an increase in time for reading out the data.

By contrast, when each interval between FMs recorded on the magnetic tape 143 is set relatively small, an amount of data stored between each adjacent FMs is relatively small. Accordingly, an amount of data between FMs to be read out from the magnetic tape 143 to extract desired data is relatively small, thus resulting in a decrease in time for reading out the data.

Thus, depending on how FM intervals are set, the time required for writing and reading FMs, and the time required for extracting desired data after the magnetic head of the tape drive 141 is positioned to the nearest FM are in a trade-off relationship.

The inventors of the present invention have focused on such relationship between the FM intervals and search time, and have come up with a configuration of changing setting values of FM intervals depending on an aspect of writing data on the magnetic tape 143 from the disk device 120, or of reading out data from the magnetic tape 143 by the disk device 120.

Here, the above search time represents the total time required from the time when the backup/restore operation unit 320 of the control unit 110 of the disk array apparatus 100 receives a request of acquiring data from the server system 300 to the time when the data recorded on the magnetic tape 143 is extracted.

The aspect of writing data on the magnetic tape 143 from the disk device 120, or of reading out data from the magnetic tape 143 by the disk device 120 represents the purpose of use of data copied or moved from the disk device 120 to the magnetic tape device 140.

As described above, in general, the larger the interval between FMs, the less the time required for the writing and reading of FMs, so that write performance is enhanced. However, when some kind of trouble occurs at the time of writing data on the magnetic tape 143 or of reading data therefrom, an amount of data needed to be rewritten on the magnetic tape 143 from the position of an FM recorded immediately before the data is large. Accordingly, the FM interval is determined in view of advantages and disadvantages of the both aspects described above.

When the magnetic tape 143 is used as a storage area for backing up a file archive of data stored in an LU of the disk device 120, the setting of relatively small FM intervals is advantageous even if the writing of data on the magnetic tape 143 takes time. This is because the positioning of the magnetic head to a further nearer FM is possible when designated data is read out from the magnetic tape 143. More specifically, FM intervals are determined in view of, for example, a frequency of accessing to a file archive data recorded on the magnetic tape 143, or an average amount of data read out at one time.

In this embodiment, an FM interval setting criterion in the former case is referred to as "Performance emphasized" (First Mode) and that in the latter case is referred to as "For file archive use" (Second Mode).

===FM Interval Setting Processing===

Next, FM interval setting processing of this embodiment will be described with reference to the relevant drawings.

First, described below is Tape Group Information Table 700 with TG information recorded therein, the information related to a TG (a table group) in which data of LU generated by the disk device 120 is stored. FIG. 7 shows an example of Tape Group Information Table 700. In this Tape Group Information Table 700, the following items are recorded: TG-ID 701, Tape Type 702, Redundant Configuration 703, Encryption Setting 704, Purpose of Use 705, LU Information 706, FM Interval 707, TG Status 708, Number of Tapes 709, and Backup Finish Time 710.

In TG-ID 701, an identification code ("0002" in the example of FIG. 7) for identifying the TG recorded in Tape Group Information Table 700 is recorded.

In Tape type 702, the type ("LTO-4" in the example of FIG. 7) of magnetic tapes 143 used for the TG recorded in Tape Group Information Table 700 is recorded. In this embodiment, the magnetic tapes 143 compliant with LTO (Linear Tape-Open) standard are used, but those compliant with other standards may also be used.

In Redundant Configuration 703, when data is stored from the disk device 120 to the magnetic tape 143, whether to select a mirroring configuration using two sets of magnetic tapes 143 is determined, and the result thus determined is recorded. In the example of FIG. 7, when employing a mirroring configuration, "Mirror" is recorded. When not employing a mirroring configuration, for example, "Non-mirror" is recorded.

In Encryption Setting 704, when data is stored from the disk device 120 to the magnetic tape 143, whether an encryption processing (e.g., 256-bit AES-GCM in LTO-4 standard) has been performed on the data is recorded. When an encryption processing is performed, "Set" is recorded, and when an encryption processing is not performed, "Not set" is recorded.

In Purpose of Use 705, in order to set suitable FM intervals depending on the purpose of use of data as described above, the purpose of use designated by the user is recorded. In this embodiment, as has been described in relation to how to consider FM interval setting, any one of "Performance emphasized" and "File archive" is recorded.

In LU Information 706, information related to an LU with its data stored in the TG recorded in Tape Group Information Table 700 is recorded. In the example of FIG. 7, LUN ("0001") attached to the LU with its data stored, and the data capacity of the LU ("1600 GB") are recorded.

In FM Interval 707, one of the following FM intervals is recorded: FM intervals set by the user through the TG information setting unit 210 of the management computer 200; and FM intervals set by the FM interval managing unit 540 of the control unit 110 on the basis of the purpose of use set by the user through the TG information setting unit 210 of the management computer 200.

In TG status 708, a state of the TG corresponding to this Tape Group Information Table 700 is recorded. In the present embodiment, any one of "Normal," "Blocked," and "Logically blocked" is recorded.

In Number of Tapes 709, the number of magnetic tapes 143 used for the TG is recorded.

In Backup Finish Time 710, the time at which storing of data from the disk device 120 on the magnetic tapes 143 of the TG is completed the last time is recorded.

Information to be recorded on this Tape Group Information Table 700 is that inputted by the user through the TG information setting unit 210 of the management computer 200. In this embodiment, Tape Group Information Table 700 is stored in the cache memory 115 of the control unit 110 of the disk array apparatus 100.

Figures 8, 9:
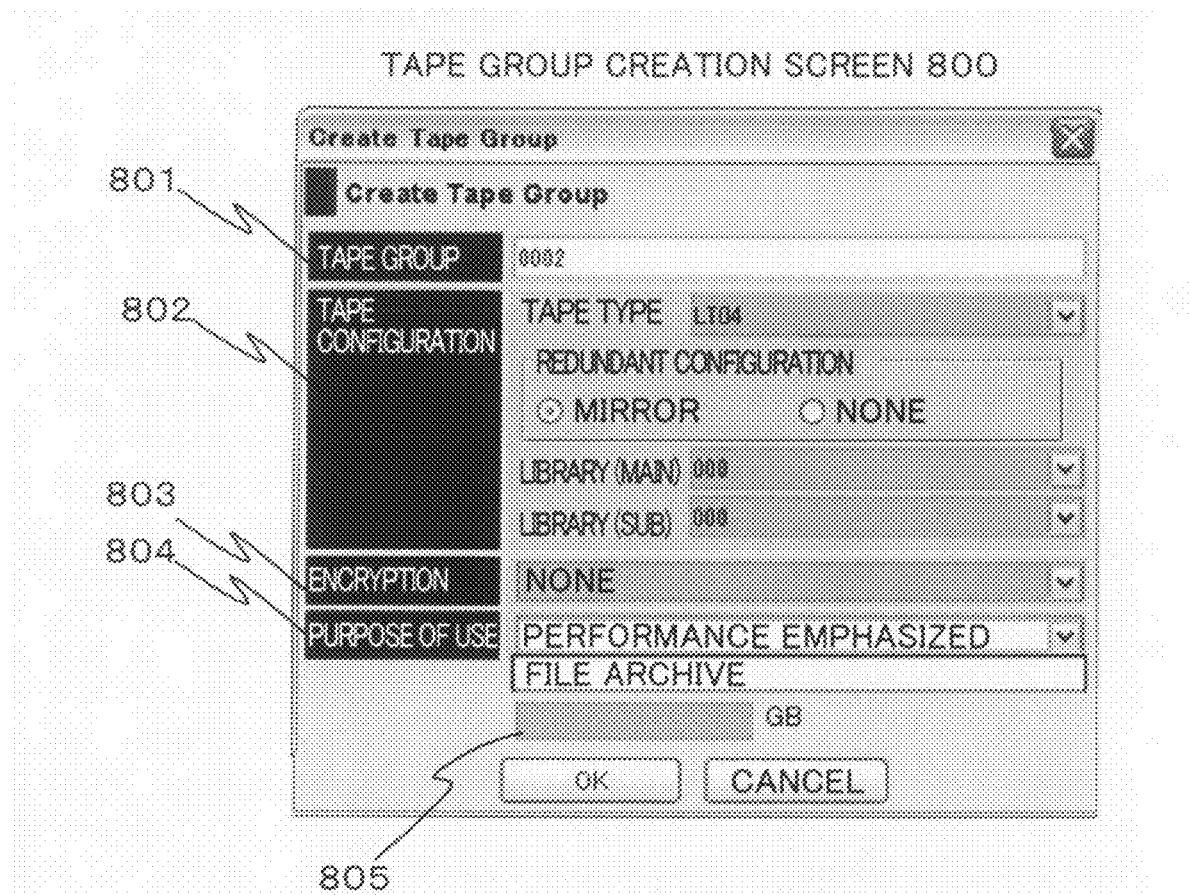
FIG. 8 is a diagram showing an example of Tape Group Creation Screen 800.
FIG. 9 is a diagram showing an example of FM Interval Setting Table 900.

FIG. 8 shows an example of Tape Group Creation Screen (TG creation screen) 800 which is presented to the user through the output device 16 of the management computer 200 so that the user can input various information pieces to be stored in Tape Group Information Table 700. Tape Group Creation Screen 800 is generated by the backup/restore operation unit 510 in the control unit 110 of the disk array apparatus 100, and is displayed on a display device, such as a liquid crystal monitor device, serving as the output device 16 in the server system 300.

To this TG Creation Screen 800, the items of Tape Group (TG) 801, Tape Configuration 802, Encryption 803, Purpose of Use 804, and FM Interval Setting Value 805 can be inputted with an input device, such as a keyboard or a mouse, representing the input device 14 of the management computer 200.

In TG 801, a TG-ID (TG identification code) to be given to a TG to be created by this Tape Group Creation Screen 800 is inputted. When the control unit 110 of the disk array apparatus 100 holds information related to an already created TG, an automatically generated TG-ID which is generated so as not to overlap the TG-ID given to the already created TG may be displayed as a default.

In Tape Configuration 802, the type of a tape, a redundant configuration, and each item of tape libraries to be used are inputted.

In Encryption 803, when data is stored in a tape, whether to encrypt the data is inputted.

In Purpose of Use 804, as the FM interval setting policy in the TG, any one of "Performance emphasized" and "File archive" is inputted. When "File archive" is selected in Purpose of Use 804, FM Interval Setting Value 805 becomes active, which allows the user to set FM intervals in units of GB.

Subsequently, FM Interval Setting Table 900 will be described. FIG. 9 shows an example of FM Interval Setting Table 900. This FM Interval Setting Table 900 is used for determining FM intervals to be set on the TG, when the FM interval processing unit 530 of the control unit 110 of the disk array apparatus 100 judges, with reference to Tape Group Information Table 700, that the recorded Purpose of Use 705 is "Performance emphasized."

In the present embodiment, in FM Interval Setting Table 900, Tape Drive Type 901, Tape Type 902, and FM Interval 903 are recorded with these three items associated with one another.

In Tape Drive Type 901, the type of a tape drive provided to the magnetic tape device 140 is separately recorded depending on applied LTO standards. Instead of the name of the standard, information such as the model number of the tape drive 141 may be recorded.

In Tape type 902, the type of the magnetic tape 143 on which data is recorded is recorded. In the example of FIG. 9, applied LTO standards are recorded in Tape type 902. Alternatively, information such as the model number of the magnetic tape 143 may be recorded.

In FM Interval 903, a value for an FM interval, which is determined in advance so as to correspond to a combination of Tape Drive Type 901 and Tape type 902, is recorded in units of GB. For the value for the FM interval corresponding to the combination of Tape Drive Type 901 and Tape type 902, for example, an empirically acquired value is recorded so that performance such as on search time can be maximized. In the present embodiment, as an example, 64 GB is set to LTO-3 and LTO-4, and 128 GB is set to LTO-5 to be soon introduced. However, it is not limited to these, and other values can be set so that user's desired performance may be obtained.

FM Interval Setting Table 900 is stored in the cache memory 115 of the control unit 110 of the disk array apparatus 100, with determined values recorded thereon in advance as described above.

Next, an example of a format of a magnetic tape with data recorded thereon according to the present embodiment will be described with reference to FIG. 10. On the leading end and the trailing end of the magnetic tape 143, management information for managing the magnetic tape 143 is recorded. In an example of FIG. 10, on the leading end of the magnetic tape 143, the following information pieces are recorded: label information including data recorded on Tape Group Information Table 700; D to T (Disk to Tape) Information including that related to backup processing; tape import speeding up information for recording information related to the LU recorded on the tape; and LU management information including information related to the LU whose data is recorded on the magnetic tape 143. In D to T Information, information on FM intervals set for a TG including the magnetic tape 143 is recorded and is referred when data is read from this magnetic tape 143.

Figure 10:
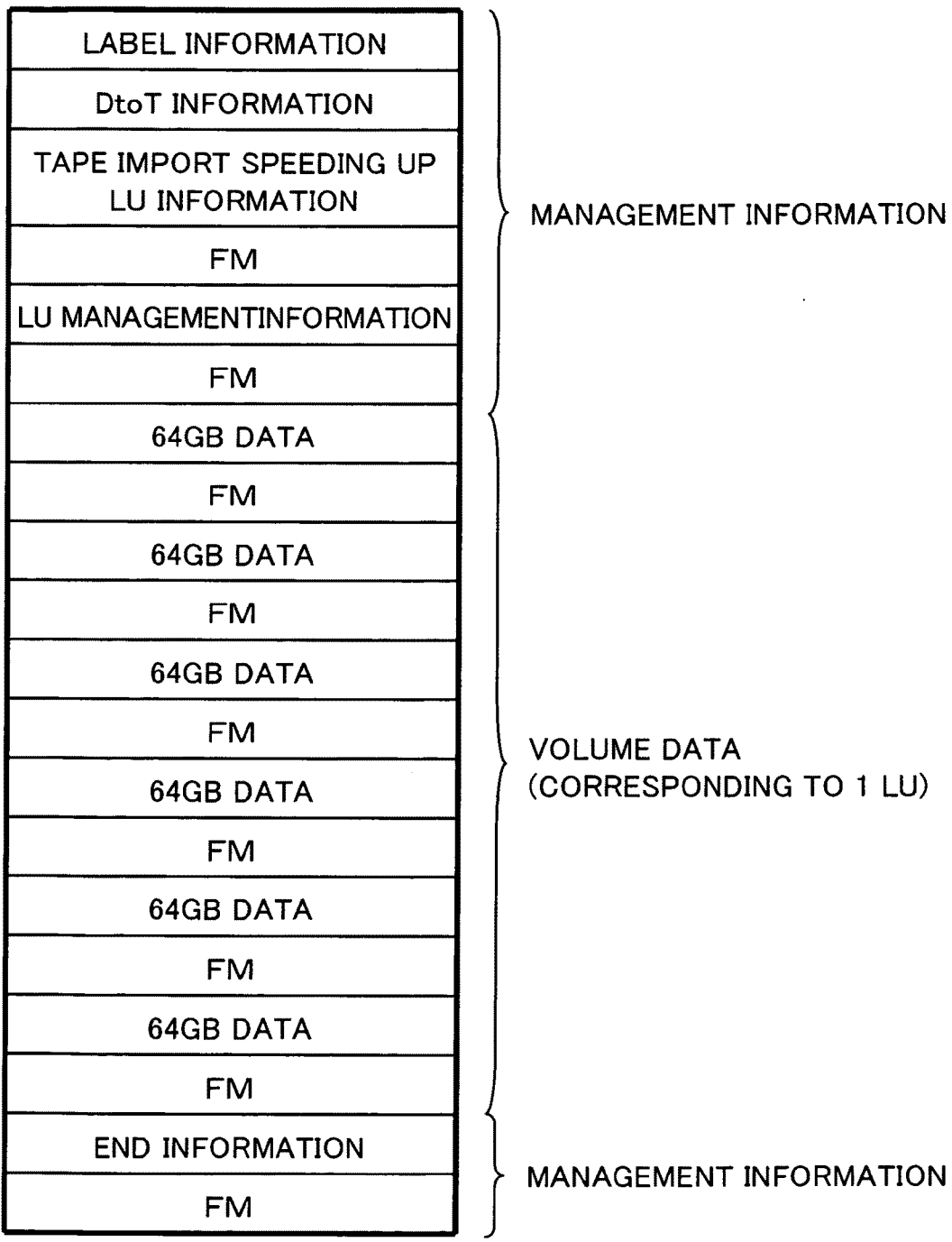
FIG. 10 is a diagram showing an example of a data recording format of the magnetic tape 143.

Further, in the example of FIG. 10, on the trailing end of the magnetic tape 143, information, such as Backup Finish Time 710, which is acquired at the time of completion of backup processing, is recorded.

Between the management information pieces recorded at the leading end and the trailing end of the magnetic tape 143, data recorded from the LU of the disk device 120 is stored. In the example of FIG. 10, every time data corresponding to 64 GB is recorded, an FM is recorded.

===Processing Flow in the Present Embodiment===

Next, processing flows, including FM interval setting processing, to be performed in the present embodiment will be described with reference to the relevant drawings.

Figure 11:
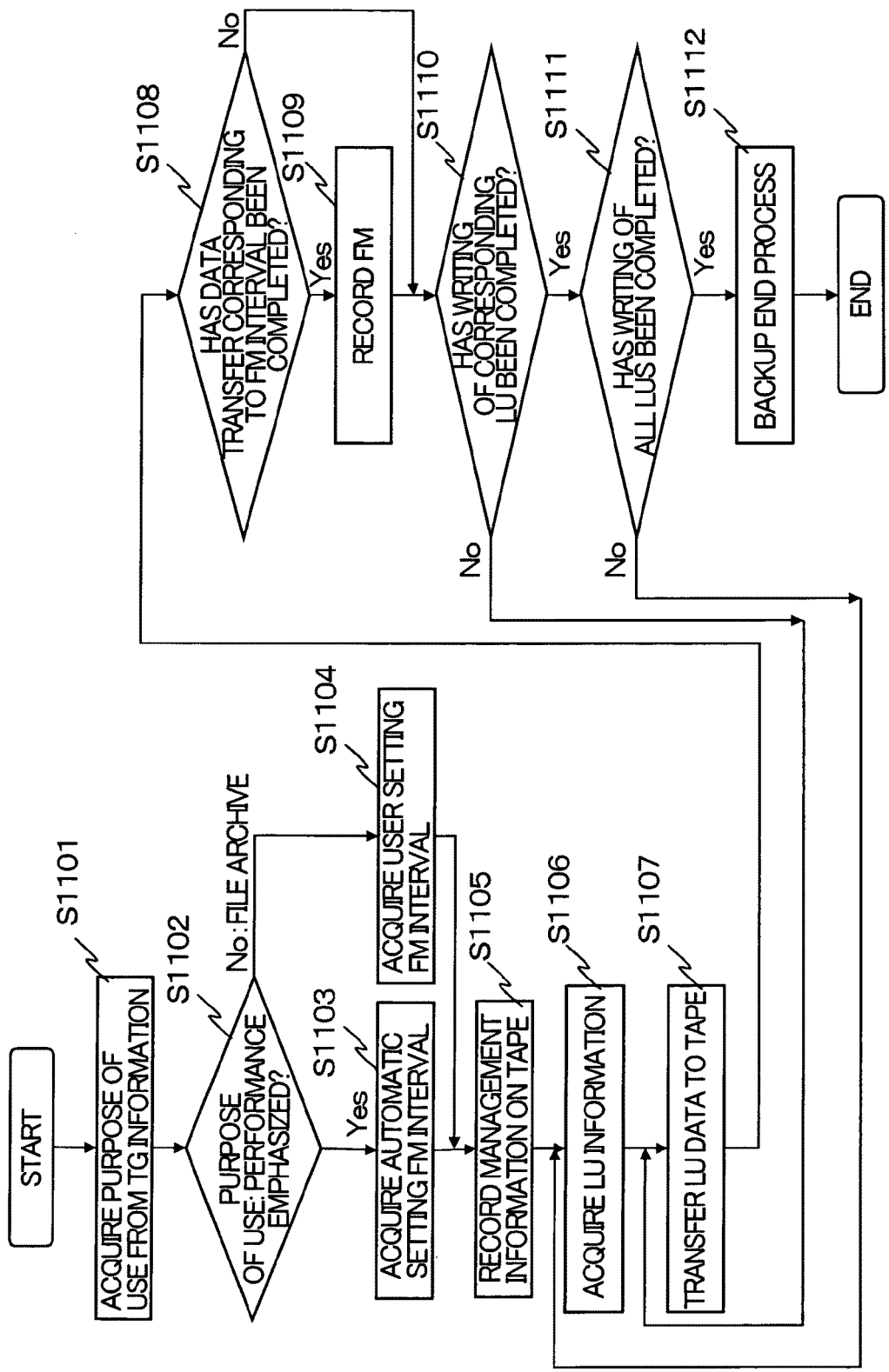
FIG. 11 is a flowchart showing an example of a processing flow of a data writing processing for the magnetic tape 143.

First, shown is a processing in the case where data of an LU of the disk device 120 is written on the magnetic tape 143 of the magnetic tape device 140. This data writing processing includes both processes of, copying data to create a backup of data of the disk device 120, and moving data to backup data recorded in the disk device 120 in the magnetic tape 143 on an LU basis. FIG. 11 shows an example of a processing flow for writing data on the magnetic tape 143.

This data writing processing starts when the backup/restore operation unit 510 of the control unit 110 of the disk array apparatus 100 receives a data writing request designating a target LU and a target TG from the backup/restore operation unit 320 of the server system 300.

First, the backup/restore operation unit 510 searches Tape Group Information Table 700 by using a designation (designated by TG-ID 701) of the received TG, and acquires Purpose of Use 705 (S1101).

Next, the FM interval managing unit 540 determines whether the acquired Purpose of Use 705 shows "Performance emphasized" or "File archive" (S1102); when determining that acquired Purpose of Use 705 shows "Performance emphasized" (Yes in S1102), the FM interval managing unit 540 searches FM Interval Setting Table 900 using Tape Type 902 included in Tape Group Information Table 700, and acquires a value of FM Interval 903 corresponding thereto (S1103).

In S1102, when determining that acquired Purpose of Use 705 does not show "Performance emphasized" (i.e., shows "File archive") (No in S1102), the FM interval managing unit 540 acquires FM Interval 707 recorded on Tape Group Information Table 700 (S1104).

Next, the backup/restore operation unit 510 records, on the magnetic tape 143 of a target TG, management information (management information recorded on the leading end of the magnetic tape of FIG. 10) including D to T information with the acquired FM interval values recorded thereon (S1105).

Subsequently, the backup/restore operation unit 510 acquires LU Information 706 of a designated LU from Tape Group Information Table 700 (S1106). The backup/restore operation unit 510, thereafter, identifies the LU provided by the disk device 120 using the LUN in LU Information 706, and starts writing data stored in the LU on the magnetic tape 143 (S1107).

While transferring the data from the LU onto the magnetic tape 143 of the magnetic tape device 140, the backup/restore operation unit 510 monitors the data transfer size, and determines whether data the amount of which corresponds to the FM interval have been written on the magnetic tape 143 (S1108). When determining that data the amount of which corresponds to the FM interval have been written on the magnetic tape 143 (Yes in S1108), the backup/restore operation unit 510 records an FM on the magnetic tape 143 (S1109). Thereafter, it is determined whether the writing of data onto the magnetic tape 143 has been completed with respect to the designated LU (S1110).

When determined that the writing of data onto the magnetic tape 143 has not been completed (No in S1110), the processing returns to S1107, and the writing of data from the designated LU is continued. When determined that the writing of data onto the magnetic tape 143 has been completed (Yes in S1110), the backup/restore operation unit 510 determines whether the writing of data onto the magnetic tape 143 has been completed with respect to all the designated LUs (S1111). When determined that the writing thereof has not been completed (No in S1111), the processing returns to S1106, and information of an LU, data of which has not finished writing in the magnetic tape 143, is acquired from Tape Group Information Table 700, and the writing processing is continued.

When determining that the writing thereof has been completed with respect to all the designated LUs (Yes in S1111), the backup/restore operation unit 510 performs a backup termination processing in which backup information is written next to the data, from the LUs, written on the magnetic tape 143 (S1112), and this processing flow is terminated.

Figure 12:
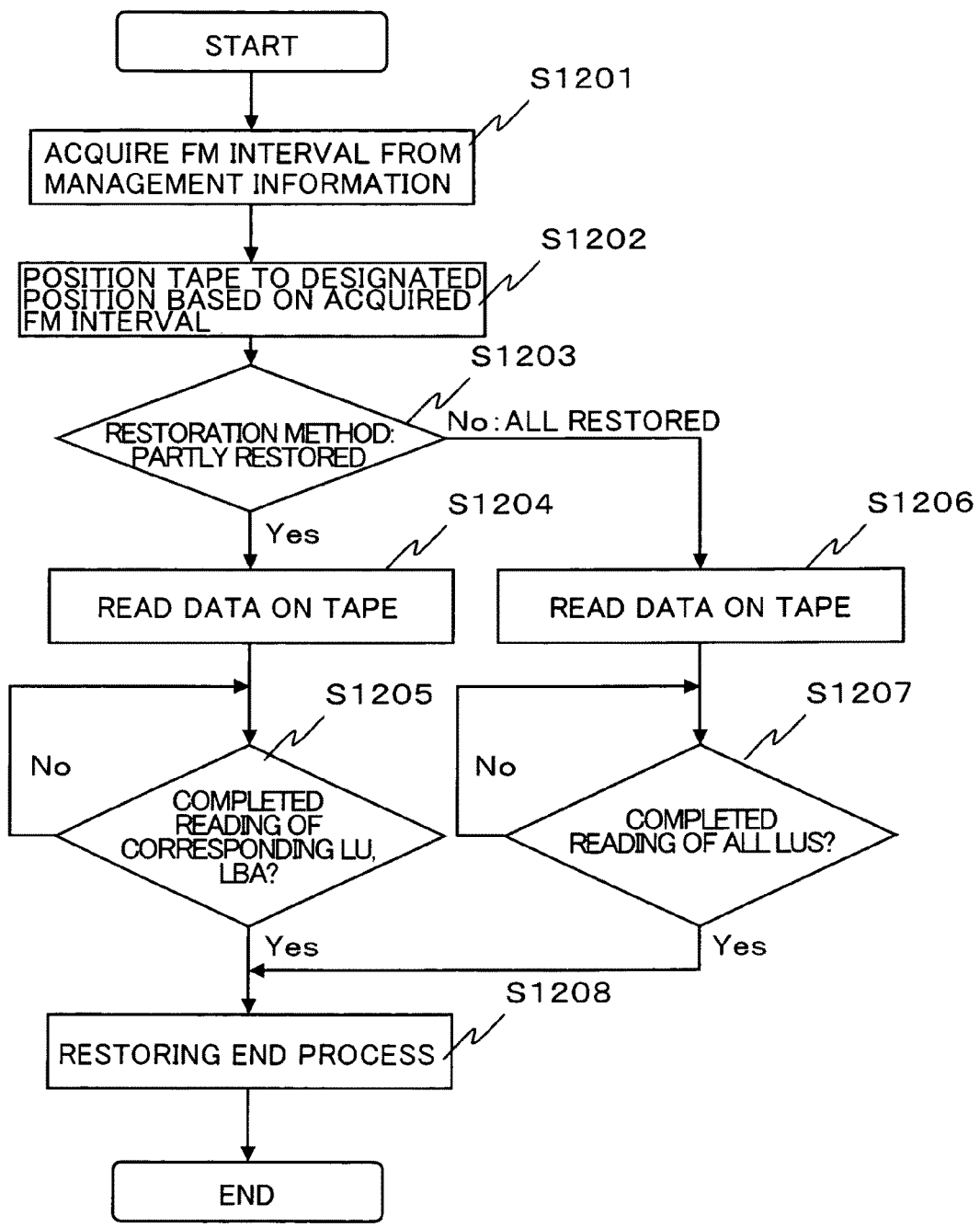
FIG. 12 is a flowchart showing an example of a processing flow of a data reading processing for the magnetic tape 143.

Next, described is a restoring processing in which data having been written on the magnetic tape 143 of the magnetic tape device 140 from an LU of the disk device 120 is read and restored to the original LU. FIG. 12 shows an example of a processing flow of a data restoring process.

This restoring processing starts when the backup/restore operation unit 510 of the control unit 110 of the disk array apparatus 100 receives a restoring request with a target LU or LBA, and a TG designated, from the backup/restore operation unit 320 of the server system 300.

First, using a designation (designated by TG-ID 701) of the received TG, the backup/restore operation unit 510 causes the magnetic tapes 143 included in the TG to be loaded on the tape drive 141, and acquires a value of an FM interval from management information recorded on the magnetic tape 143 (S1201).

Next, the backup/restore operation unit 510 calculates how many FMs come before an area with data to be restored recorded thereon on the basis of the acquired value of the FM interval and the designated LBA, and the backup/restore operation unit 510 positions the magnetic head of the tape drive 141 to an FM closest thereto in accordance with the result thus calculated (S1202).

Subsequently, the backup/restore operation unit 510 determines whether a restoring command received from the user represents partial restoring in which a part of data of an LU provided by the disk device 120 is to be restored (S1203). When determining that the restoring command represents the partial restoring (Yes in S1203), data corresponding to the designated LU or LBA is read from the magnetic tape 143 (S1204).

The backup/restore operation unit 510 determines whether all the data corresponding to designated LUs and LBAs have been read (S1205). When determined that not all the data have been read (No in S1205), the processing returns to S1205 to continue the reading of data.

When determining that all the data have been read (Yes in S1205), a restoring termination processing is performed (S1208), and this processing flow is terminated.

On the other hand, when determining that the restoring command does not represent the partial restoring (i.e., "Restoring all" in which data is restored to all the LUs provided by the disk device 120) (No in S1203), the backup/restore operation unit 510 reads out data corresponding to a first LU from the magnetic tape 143 (S1206).

The backup/restore operation unit 510 determines whether data corresponding to all the LUs have been read (S1207), and when determined that not all the data corresponding to all the LUs have been read (No in S1207), the processing returns to S1206 to continue the reading of data. When determining that all the data have been read (Yes in S1207), the processing moves to the restoring termination processing of S1207.

In this embodiment, as has been described above, it is possible to set suitable FM recording intervals according to the purpose of use, which is designated by the user, of data of the magnetic tape device 140. Thus, the performance of the magnetic tape device 140 can be optimized in accordance with the purpose of use.

Figure 13:
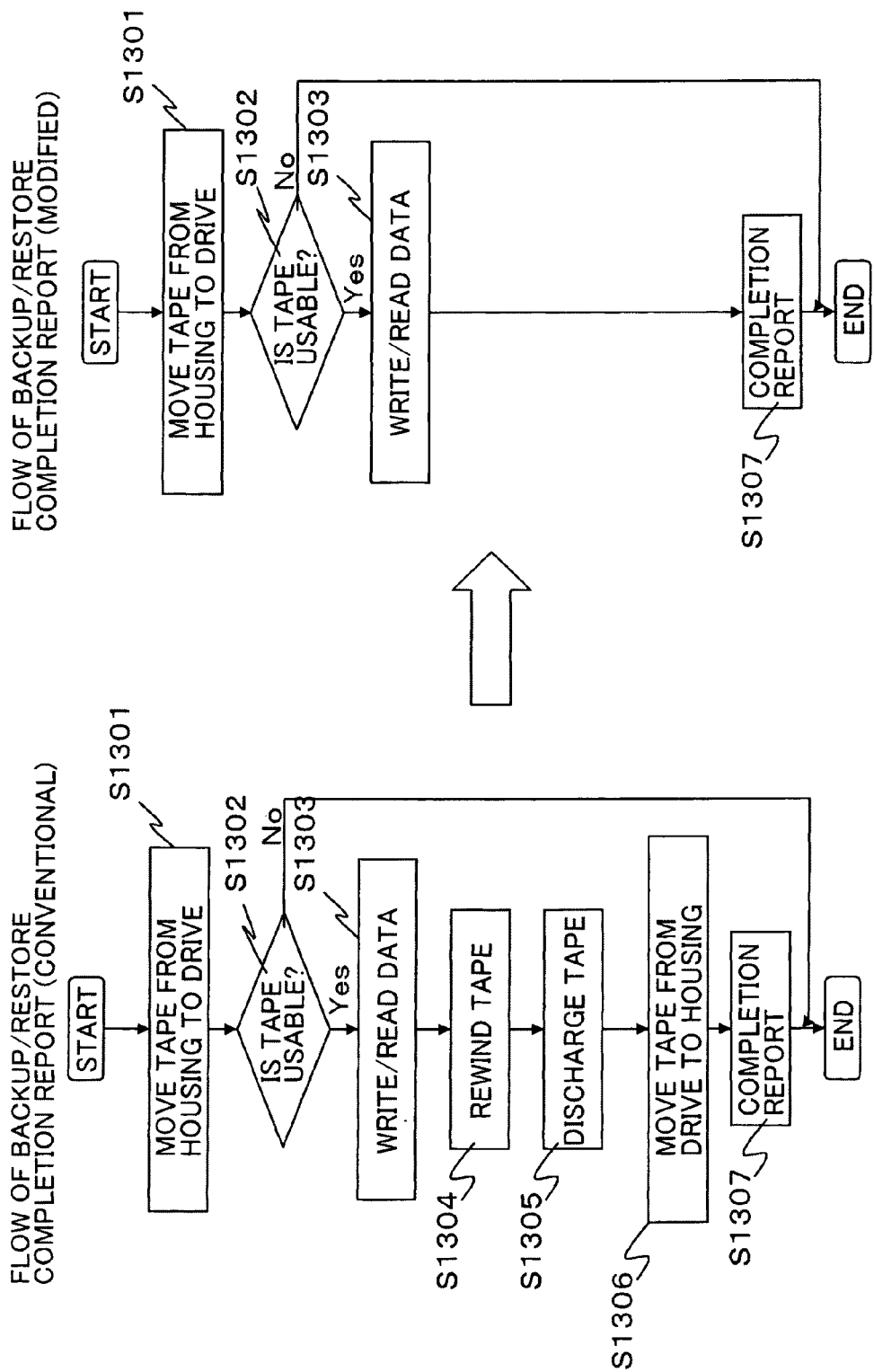
FIG. 13 are flowchart showing comparative examples of reporting completion of processing flows on a data writing/data reading to/from an external device.

Next, described is a processing flow, which can be added to this embodiment, related to a processing completion report of the writing of data on the magnetic tape 143, or of the restoring of data from the magnetic tape 143. FIG. 13 is a diagram for explaining a modified processing flow related to the processing completion report of the writing/restoring of data by the backup/restore operation unit 510 of the control unit 110 of the disk array apparatus 100 on/from the server system 300.

The left side of the drawing shows a conventional processing flow, and the right side thereof shows a modified processing flow. In the conventional processing flow, when receiving a request on the writing or restoring of data from the server system 300, the backup/restore operation unit 510 instructs the magnetic tape device 140 to move the magnetic tape 143, and the handling mechanism 144 moves the magnetic tape 143 to the tape drive 141 in response to this instruction (S1301).

It is determined whether the magnetic tape 143 is usable in the tape drive 141 (S1302), and when determined that the magnetic tape 143 is usable (Yes in S1302), the writing of data on the magnetic tape 143, or the reading of data from the magnetic tape 143 is performed (S1303).

Next, the magnetic tape 143 is wound back to the leading end (S1304) to discharge the magnetic tape 143 from the tape drive 141 (S1305). The discharged magnetic tape 143 is returned from the tape drive 141 to the housing 142 with the handling mechanism 144 (S1306). At the time when this magnetic tape 143 is returned to the housing 142, the backup/restore operation unit 510 transmits a processing completion report to the server system 300 (S1307).

As has been described above, when the completion report is not transmitted to the server system 300 by the time the magnetic tape 143 is returned to the housing 142, there was a problem that although the writing/reading of data on/from the magnetic tape 143 is substantially completed in the magnetic tape device 140, the server system 300 must wait without being able to make the next processing request.

With such a background, in the modified configuration, as shown in the processing flow on the right side of FIG. 13, at the time when the writing/reading of data is completed (S1303), without waiting for the magnetic tape 143 to return to the housing 142 a completion report is transmitted to the server system 300 (S1307).

Such a configuration enables the server system 300 to give the next processing request to the control unit 110 of the disk array apparatus 100 without waiting for the magnetic tape 143 to return to the housing 142 in the magnetic tape device 140. Moreover, there may be a case in which data requested for the next writing or reading have already been recorded on the magnetic tape 143 on which an immediately preceding processing has been completed and which has not been returned to the housing 142. In such a case, time in order of minutes can be saved, which had been spent for the magnetic tape 143 once returning to the housing 142, and in response to a new processing request, being taken out of the housing 142 once again to be loaded on the tape drive 141. And as a result, improvement in performance is enhanced.

Next, in relation to the above additional configuration, a modification in the case where an archive file stored in the magnetic tape 143 is read out will be described.

In the configuration employing modified completion report timing, described above, after the reading of data from the magnetic tape 143 is completed, the magnetic tape 143 remains in the tape drive 141. Accordingly, when a request for an addition of data onto or for the reading of data from the magnetic tape 143 is made from the server system 300, a data writing processing or a data reading processing can be immediately performed without the transfer time of the magnetic tape 143 between the housing 142 and the tape drive 141.

Hence, after the completion of the previous writing/reading of data, with the magnetic tape 143 remaining in the tape drive 141, the reading of data to be read next is performed in advance. Thereby, when a request for reading the data thus read in advance is made, reading time can be saved. To be more specific, for example, data located between an FM recorded immediately after the data whose read-out processing has been completed last time, and an FM next to the above FM is read and stored in the cache memory 115 in advance. When the cached data is the data to be read out in response to the next reading request, reading time is shortened to a large extent.

The present invention has been described above in accordance with the embodiment with reference to the accompanying drawings. However, the present invention is not limited to the above embodiments. Further, various modifications and equivalents can be made without departing from the gist of the present application.

What is claimed is:

1. A storage system having a function to back up data stored in a storage area, the storage system comprising:
   a storage device that includes a storage medium providing the storage area;
   a magnetic tape device that includes a magnetic tape providing a storage area, which is a data write destination, where the data stored in the storage area of the storage device is to be backed up;
   a control unit that performs writing and reading processings of the data between the storage device and the magnetic tape device; and
   a tape position information recording interval managing unit coupled to the storage device and the magnetic tape device,
   that receives backup type information, which is information indicating a backup type when backing up the data to the magnetic tape,
   acquires tape position information recording interval information corresponding to the backup type information thus received, from the tape position information recording interval information which is held in association with the backup type information thus received and which indicates a recording interval of tape position information on the magnetic tape, the tape position information being positional information recorded on the magnetic tape to associate a data storing location in the storage medium and a recording location of the data on the magnetic tape with each other, and
   transmits, to the control unit, the tape position information recording interval information thus acquired.

2. The storage system according to claim 1, wherein the tape position information recording interval information is represented by an amount of the data stored on the magnetic tape in an interval at which the tape position information is recorded on the magnetic tape.

3. The storage system according to claim 1, wherein the data is backed up to the magnetic tape in units of logical volumes created in the storage area.

4. The storage system according to claim 1, wherein
   there are defined at least first and second modes for the backup type information,
   there is kept, by the tape position information recording interval managing unit, a type of the magnetic tape in which the data is stored, and the tape position information recording interval information corresponding to the type of the magnetic tape, and
   the tape position information recording interval managing unit acquires the type of the magnetic tape in which the data is stored, when the backup type information of the first mode is received, and acquires the tape position information recording interval information corresponding to the type of the magnetic tape, and transmits, to the control unit, the acquired tape position information recording interval information.

5. The storage system according to claim 4, wherein the tape position information recording interval managing unit transmits, to the control unit, tape position information recording interval information received along with the backup type information, as the tape position information recording interval information, when the backup type information of the second mode is received.

6. The storage system according to claim 1, wherein
the control unit transmits information including information indicative of completion of the writing to an external device, when determining that writing, of the data designated by the external device, from the storage device to the magnetic tape of the magnetic tape device has completed.

7. The storage system according to claim 1, wherein
the control unit reads, in addition to a data designated by a data read command, the data recorded following the tape position information which is recorded immediately after the data designated by the data read command, when the command to read data from the magnetic tape from the external device is received.

8. The storage system according to claim 1, wherein the storage device is a disk array apparatus including a plurality of hard disks.

9. The storage system according to claim 1, wherein the control unit generates information input screen data to input the backup type information into the tape position information recording interval managing unit.

10. An operation method of a storage system having a function to back up data stored in a storage area, the storage system including a storage device that includes a storage medium providing the storage area; a magnetic tape device that includes a magnetic tape providing a storage area, which is a write destination, where the data stored in the storage area of the storage device is to be backed up; and a control unit that performs writing and reading processings of the data between the storage device and the magnetic tape device, the method comprising:
receiving backup type information, which is information indicating a backup type when backing up the data to the magnetic tape;
acquiring tape position information recording interval information corresponding to the backup type information thus received, from the tape position information recording interval information which is held in association with the backup type information thus received and which indicates a recording interval of tape position information on the magnetic tape, the tape position information being positional information recorded on the magnetic tape to associate a data storing location in the storage medium and a recording location of the data on the magnetic tape with each other; and
transmitting, to the control unit, the tape position information recording interval information thus acquired,
wherein each step is performed by a tape position information recording interval managing unit coupled to the storage device and the magnetic tape device.

* * * * *